Sept. 12, 1961 A. B. DUNWODY 2,999,596
METHOD AND APPARATUS FOR THE SEGREGATION OF PARTICULATE MATERIAL
Filed Oct. 6, 1955 2 Sheets-Sheet 1

INVENTOR.
ARCHIBALD B. DUNWODY
BY
ATTORNEY

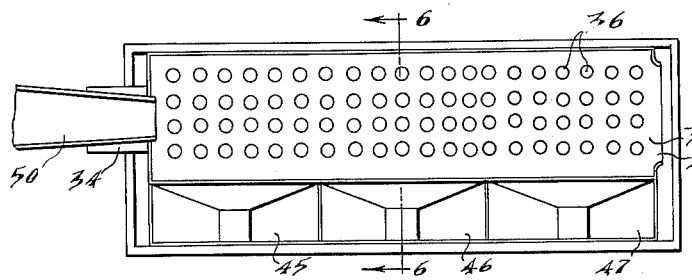
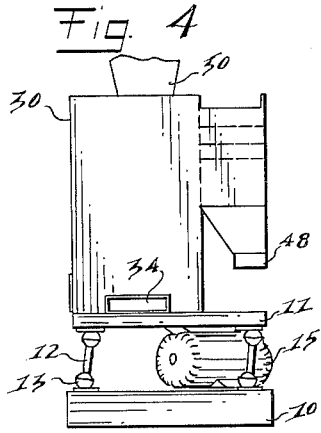
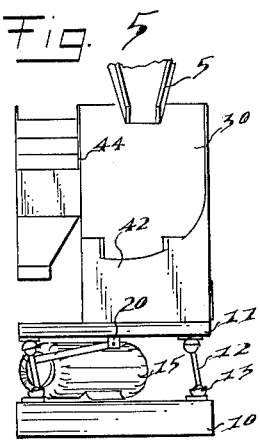
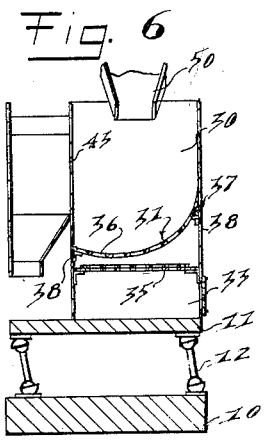
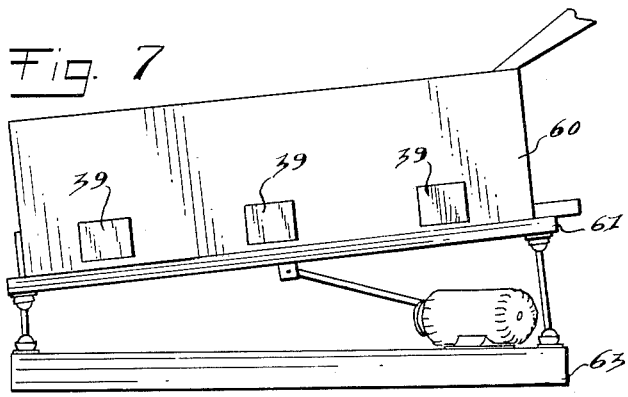
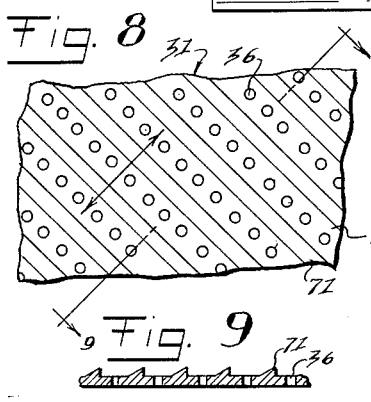
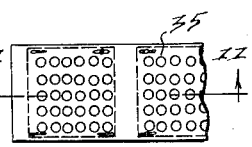

United States Patent Office 2,999,596
Patented Sept. 12, 1961

2,999,596
METHOD AND APPARATUS FOR THE SEGREGATION OF PARTICULATE MATERIAL
Archibald B. Dunwody, 2640 Peachtree Road NW., Atlanta, Ga.
Filed Oct. 6, 1955, Ser. No. 538,931
3 Claims. (Cl. 209—467)

This invention relates to separating, assorting and/or classification methods and to apparatus for performing such methods. More specifically the invention relates to a method and apparatus for the segregation of particulate material into species characterized by differences in specific gravity or relative bulk density or relative "flotability" in air.

Heretofore methods and apparatus have been employed to separate particulate, related to size and shape by use of screens, related to density by use of gravity separators or "tables," related to other characteristics by use of magnets, color selection, liquid fluid flotation, selective flotation, electro-static separators, as well as other specific procedures.

Limitations in the effectiveness and efficiency of separation techniques, above referred to, persist. Each is characterized by inherent problems. Where mechanical motion alone is applied, bulk or shape may be the predominant factor if not the sole criterion for selectivity. Where fluid streams, usually air, are employed, bulk or configuration may determine the isolation of one group from another regardless of individual particle weight. Applicant has discovered that by a new application of mechanical motion and fluid flow, separations of particulate can be accomplished with efficiencies beyond the scope of existing apparatus or method.

It is therefore among the more general objects of the present invention to provide a novel and improved method and apparatus for the selective isolation of characteristic forms of particulate solid matter.

More specifically, it is among the objects of the present invention to provide a method of and apparatus for the combined application of mechanical motion and fluid flotation in the separation of solids.

It is also an object of the present invention to provide a method of and apparatus for separating, sorting or classifying materials whereby specific gravity as well as bulk may combine as distinguishing criteria.

Another object is to provide a method and apparatus by which flotation may be imparted to the indiscriminate mass undergoing separation without such flotation constituting a separation but rather a stratification by means of which mechanical motion may more effectively and efficiently be applied for the separation.

A further object is to provide a method of and apparatus for separation by which mechanical motion may be employed with enhanced advantage not only as to the separation itself, but for the motivation of materials through the separating phases.

These and numerous other objects, features, and advantages of the invention will be apparent from a consideration of the following specification taken in conjunction with the accompanying drawings, in which:

FIG. 3 is a top plan view of the apparatus.

Figure 1:
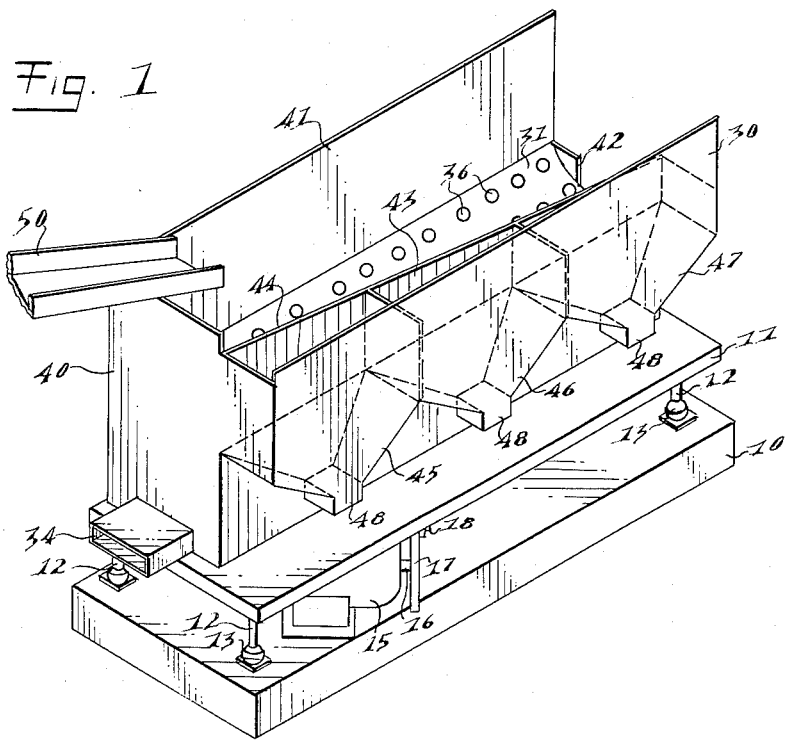
FIG. 1 is a perspective view of one structural embodiment of the apparatus of the present invention by which the inventive method may be carried out.
Figure 2:
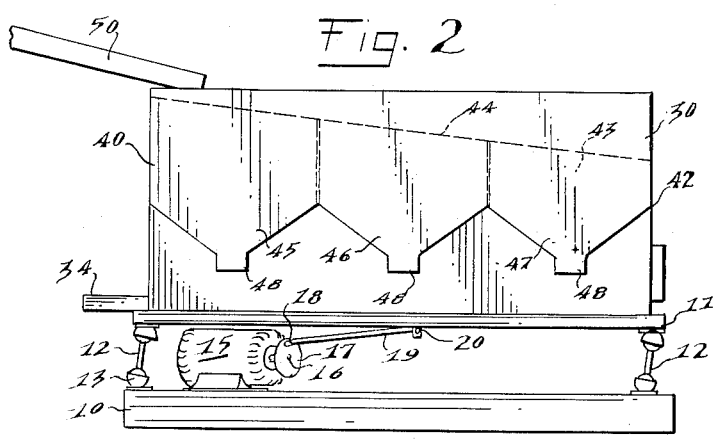
FIG. 2 is a side elevation of the apparatus of FIG. 1.

FIG. 4 is an end elevation of the intake end of the device.
FIG. 5 is a similar view of the discharge end.
FIG. 6 is a cross-sectional view taken on line 6—6 of FIG. 3.
FIG. 7 is a side elevation of a modification of the structure of FIG. 1.
FIG. 8 is a fragmentary top plan view of a modified form of the trough; and
FIG. 9 is a sectional view taken on line 9—9 of FIG. 8.
FIG. 10 is a fragmentary plan view of the air control baffles.
FIG. 11 is a sectional view taken on line 11—11 of FIG. 10.

The method of the present invention may be broadly defined as the application of a fluid current to an indiscriminate mass of distinguishable particles while simultaneously applying a segregating motion thereto. More specifically, the method contemplates the flotation of certain lighter or more bulky constituents from heavier or more dense portions while the entire mass is agitated. The method embraces the continuous traversal of the mass while under flotation to the end that individual species may be progressively isolated. In considering the method, the fluid current is primarily considered as a means of buoyancy rather than a blower action as in the separation of chaff from wheat. Furthermore, the agitation is preferably designed to promote material travel as well as segregation of stratas of varying buoyancy.

The apparatus of the present invention may be characterized as providing a perforate trough mounted over a plenum by which material passing therethrough will be subjected to the buoyant effect of controlled fluid currents together with agitating means to shake out or spill off successive top stratas. The agitation is further designed to promote travel of the successively remaining mass as successive top increments are discharged. In a modified form of the apparatus the trough mounting is shown as tilted, as shown in FIG. 7. Also as shown in FIGS. 8 and 9, ribs may be provided of saw tooth cross section to insure the feeding and spreading motion of the mass, and for any roughening of surface to add friction values for conveyance. The specific structural details here presented while constituting inventive features of the apparatus are not intended to imply a restriction as to the use of numerous and varied changes, modifications and the substitution of equivalents as may seem expedient.

Referring to the drawings wherein one structural embodiments is presented by way of illustration, the apparatus comprises a base 10 surmounted by a relatively movable table 11. The table 11 is here shown as supported in parallelism from the base 10 by four corner posts 12 each of which is secured to both base and table by universal mountings in the form of ball and socket fixtures 13. The present inventive concept is by no means restricted to this particular structure nor to like details of design herein often referred to. The concept does embrace, however, the idea of a movable table or support for the separator per se presently referred to. The motions to which the table 11 may be subjected may be of a wide variety both as to amplitude and rapidity. They may be regular or irregular, in a single plane or with vertical as well as horizontal components. Hence, the mounting of the table may be such as those skilled in the art may find appropriate. It should be pointed out, however, that with the present construction the corner posts may be telescopic to accommodate the planar motion of the table in a direction angularly related to both the longitudinal and transverse axes.

As here shown motion may be transmitted to the table 11 from a motor 15 mounted on the base 10 with its motor shaft 16 disposed in a plane normal to neither the sides nor the ends of the base. Upon the motor shaft is mounted a crank disc 17 with its crank 18 pivotally engaging the lower end of an upwardly inclined pitman 19, the upper end of which is pivotally secured as at 20 to the underside of the table 11 at a point transversely and longitudinally spaced from the location of the crank disc. By this arrangement it will readily be seen that rotation of the motor will impart rotation to the disc in a plane obliquely disposed with respect to the base and table. The pitman reciprocating in this plane will thus oscillate the table with respect to the base in a direction normal to the center disposition of the motor shaft. Any one of several other means may give satisfactory, directed oscillation. As indicated, the type and frequency of motion may be determined by combined factors such as the materials to be sorted and the buoyancy imparted thereto by the applied fluid stream.

The separator itself is fixedly secured upon the upper face of the taable 11 in any desired manner and comprises an elongate generally rectangular open top casing 30. Within the casing an exchangeable intermediately mounted U-shaped perforate trough 31 horizontally divides the casing to define a lower plenum chamber 33. Fluid under pressure, most conveniently air, is supplied to the plenum chamber 33 from any suitable source (not shown) by way of a duct 34. Such fluid will escape upwardly from the plenum chamber thru a baffle 35 adjustable to direct and control the air mass through the perforations 36 in the trough 31. As indicated at 37, the trough is preferably formed with edge flanges adapted to be freely seated upon inwardly extending beads 38 whereby the trough may be readily removed and replaced by similar troughs of varying aperture sizes and spacings and/or of differing cross-section. The baffle 35, to control air flow through the perforated portion of the trough, is so arranged to control the diffusion of fluid mass and so direct it with greater or lesser intensity of flow to any portion of the perforate or porous trough. This baffle shall be readily adjustable either by removing and inserting baffles of various patterns to direct flow or by a series of adjustable openings to direct flow. The baffles shall preferably be adjustable while the separator is in operation and ready access to the baffles is provided through access doors 39.

In carrying out the method of the present invention the supply of fluid will be adjusted so that in passing upwardly through the trough, it will entrain and suspend at least part of the material to be separated. Such suspension will be such as to tend to stratify the material in relation to specific gravity of particles of like size or in relation to bulk with respect to particles of equi weight. Where particles differing in both bulk and weigh are included the bulkier ones may be stratified with those of smaller size but lighter weight. It should be noted that the fluid blast emerging upwardly from the plenum chamber is not primarily intended to fully entrain or blow free of the trough any constituents of the material. Such fluid flow is primarily intended to create a buoyancy in the material such as to facilitate separation under motion as hererinafter discussed. This is not to exclude, however, the inclusion of pure air flow separation if such may be desired for the lighter particles. Where such separation is utilized, the apparatus may include a hood for discharging such separated portions. Furthermore a hood and suction means may be employed in lieu of the pressure supply from the duct 34.

While the receiving end wall 40 of the casing 30 and one side wall may be of uniform height and both of greater vertical extent than the opposite side of the discharge end 42, the opposite side 43 is provided with a top edge 44 disposed at a declining angle from the receiving end wall 40 to the discharge end wall 42. While here shown as a straight angularly sloping edge it is contemplated that the side wall may be formed with a downwardly stepped series of horizontal top edges if desired. Also it may be adjustable vertically so that any portion of the material may be discharged over wall 43. The upper edge 44 of the wall 43 constitutes a material cutting or segregating edge.

In the operation of the device while the fluid flow causes a stratified suspension of material with the lighter constituents uppermost, vibration will impart a sideways component of motion to cause such lighter constituents to spill over the wall at level commensurate with the stratified constituent. Since in so moving over the cutting edge 44 the material is freed of the buoyancy of the fluid flow, such constituents will be separated to fall downward by gravity.

With respect to agitation having transverse as well as longitudinal components, it will be understood that such agitation will give the mass as a whole a generally circular motion in spiral form from inlet to outlet. But since lighter particles will never displace heavier ones the circulatory motion will be individualized as to separate stratas.

Arranged along the outer face of the wall 43 in contiguous end to end relationship there is provided a series of material receiving and delivering hoppers, here shown as three in number, 45, 46, and 47. At the lower end of each hopper a delivery spout 48 is provided. By this arrangement it will be seen that the material discharged over the cutting edge of any particular aggregate height as bounded by the declining wall edge which subtends a given hopper will be received by such hopper for separate discharge therefrom. Where a sloped wall is used, it will be understood that each successive hopper will subtend each successive downward step. Other means of diverting any portion of the material can be used to deliver a strata of material into a receiver.

Material to be separated is supplied preferably continuously, but in batches or increments if desired, over the receiving end wall 40 by means of a supply chute 50. The longitudinal component of motion of the chamber will cause the successively remaining and successively heavier or more dense portions of remaining material to travel towards the discharge end wall 42 which is adapted to be fitted with a final discharge spout. If desired, the floor of the trough may tilt towards the end wall 42 to facilitate such travel and minimize the necessity for such longitudinal component of motion.

Such mounting of the trough may be provided in the manner of FIG. 7 when the casing 60 and its table 61 are inclined towards the discharge end with respect to the base 63.

The trough may be constructed such that one portion of it may have a greater or lesser slope in relation to the base. It is contemplated that one portion of the trough shall be generally horizontal while another portion is inclined.

From the foregoing it will be seen that as the method is carried out, material is supplied over the receiving end wall 40 and is immediately subject to the flotation action of the rising stream of air. Lighter or comparatively bulky constituents will be suspended in a higher plane than those of less weight or bulk while dense masses may not be suspended at all and will travel, due to agitation, lengthwise of the trough to be discharged at the end 42. The adjustment of fluid flow, trough apertures, and vigor and direction of vibration is such as to suspend the very lightest components just above that portion of the edge 44 subtended by the first hopper 45. The lateral component of motion will deliver this upper strata over such edge to drop by gravity into the hopper 45. The remaining mass of material will move downwardly of the trough toward the discharge end due to the longitudinal component of motion and in so moving the declining edge 44 will register with the next successive strata of material lighter than the other remaining components. Such second strata will similarly be delivered sideways to the next successive hopper and so on until the non-flotation material is vibrated over the end 42 for discharge from a suitable spout. It will of course be understood that as many hoppers may be provided as segregated strata are contemplated. As above noted, the vibration diagonally of the casing imparts a generally circular motion to the mass due to the upwardly curved sides of the trough. Upper lighter particles will not displace lower heavier ones but, in general and particularly for individual groups, a spiral motion will take place.

As shown in FIGS. 8 and 9 the trough tread indicated at 70 may be provided with ribs or elongate teeth 71 of saw tooth cross section their flat faces lying normal to the direction of vibratory motion and facing the direction of the desired helix to be set up. By this construction motion in one direction will promote longitudinal feed and circular motion while reverse movement of the particles is precluded.

When a mixture of the same size and shape particle is put in the trough and air is blown through them, the lighter particles tend to rise higher than the heavier particles. If the source of air is through a perforated or porous surface, the velocity diminishes on leaving the orifice. If the velocity is kept below the conveying force, then a gentle buoyancy is imparted to the particles. They become somewhat air borne or partially suspended. This partial suspension gives the whole mass a fluid characteristic. The air rising up through the particles with diminishing velocity produces a buoyancy which lifts the lightest particles to the top of the mass.

With the present apparatus, the side 43 is lower than side 41, hence "fluid mass" will tend to spill over side 43. The transverse component of trough oscillation gives conveyance across the trough. The particles thus "flow" or move in the direction of conveyance and tend to climb the wall 41. Such climbing will persist until their weight balances the force of conveyance and as more particles crowded underneath the bottom of the pile the particles will roll or slide down the slope with the lightest particles at the top of the now flowing mass. Side 43 being lower will skim off any percent of the mass as desired. Thus, in the present construction there is the force of conveyance moving the mass, the force of air lifting the mass and the force of gravity holding the mass down. The resultants of these three forces can cause odd patterned whirling motion and the path of travel of any one particle in the mass will be related to forces exerted and to its "Air Flotability." Several odd patterns of particle motion may take place at the same time.

Since the force of conveyance (oscillation) has components other than perpendicular to the elongated trough, i.e. longitudinal, or if the discharge end is lowered, the general movement will be in the direction of the longitudinal force or lower end. If a continuous feed of material is introduced, the movement will be in the direction of the compound components such that pattern of motion of any particle will be a form of spiral-like path progressing away from the feed or in the direction of such compound components. With air fluidizing the mass, the lightest or most "air flotable" will rise and cascade over the top of the mass and if the discharge edge 44 is raised or lowered, any percentage of the mass could be discharged therefrom. If a gradation of edge levels is made, a gradation of products of discharge could be made. Any desired percentage of "lights" or any desired percentage of "heavies" or any gradation of "lights" or "heavies" or any separation of particles of different "Air Flotability." The lowering of the end of the trough is by no means required. It might even be higher than the feed end. Just as the frequency and amplitude of the vibration as well as the angle with respect to the trough at which it is applied can effect the rate of conveyance, so also can the level of the trough.

It will be understood that if the discharge end were raised high enough, nothing could climb out the end of the trough; if the discharge end were lowered enough, everything would flow out the discharge end; if the side were raised high enough, nothing could discharge over the side; if the side were lowered far enough, everything would tend to flow over the edge. If too little air is allowed, the mass would not become fluidized and no separation would occur; if too much air were allowed, the whole mass would be blown upward without control; if too little "feed" is allowed, no mass action would occur and hence no separation; if too much "feed" is allowed, the trough would be flooded beyond control.

The amplitude and frequency of shake will be related to the mass action of the material treated; in general, higher frequencies with lesser amplitudes can be used on smaller, denser masses. For instance, high speed short strokes for clover seed as compared to slow long strokes for walnuts. Inasmuch as an extremely wide variety of materials may be handled with wide differences in separability the exacting demands for precise separation will govern the rate of vibration of the material, hence no attempt is made to limit the angle of agitation nor the angle of slope of the trough. The trough could be built such that its bottom may have a variation in pitch or slope. Somewhat the same effect could be caused by using the baffles to direct a greater air flow towards the discharge end of the perforate trough. Increased air would lift the material higher to help them discharge over the side.

In the practice of my invention, just enough air shall be allowed to give buoyancy to the heaviest particle in the mass, just enough "feed" to keep the trough full, just enough swirl or spiral motion to constantly bring the most "Air Flotable" particles to and over the side and just enough conveyance to give the desired capacity. As shown in detail in FIGS. 10 and 11, there is preferably provided below the perforate trough 35 relatively slideable perforate baffles 80, the aperture of which may be adjusted to vary the there related registration so as to control the upward air flow. Securing pins 81 interconnect such baffles for such relative motion and access doors 39 permit access to adjust the baffles while the device is in operation. The proportions of the unit shall vary with specific requirements but in general its length shall be about 4 to 5 times the trough width and the trough depth shall be about the same or greater than its width. The bottom of the trough may vary but in general it shall be straight and have a modified curved cross-section of U-shape.

From the foregoing, it will be seen that the present invention provides a novel, simple, improved, effective and efficient method and apparatus for the separating, assorting and/or classification of particulate solids by a combination of fluid stream and agitation techniques. The invention is broadly applicable to a wide variety of materials by adjustments of fluid and vibration characteristics. It will be understood that the method steps herein set forth may be altered and modified as occasion dictates and that the apparatus may be conformed to meet varying demands both without departing from the spirit or scope of the invention as defined in the appended claims.

I claim:

1. A separating apparatus including a trough of generally U-shaped cross section, means for feeding material to be separated to said trough, fluid flow means for stratifying said mass, and means for vibrating said trough with both longitudinal and transverse components of motion to produce spiral motion of particles of said material, said trough being bounded by at least one wall of varying longitudinal height below that of the opposed wall.

2. In a device of the character defined, a movably mounted separator and means for imparting vibration to said separator in a direction to produce helical motion of particles of a mass in said separator, said separator including a casing having a plenum chamber, a perforate trough thereover having one wall lower than another, together with continguous hoppers arranged adjacent said lower wall, and an adjustable baffle located under the perforate trough.

3. The device as set forth in claim 2 in which hand holes give access to the adjustable baffles so that the baffles may be adjusted while the device is in operation.

References Cited in the file of this patent

UNITED STATES PATENTS

| | | |
|---|---|---|
| 250,544 | Johnson | Dec. 6, 1881 |
| 900,442 | Stebbins | Oct. 6, 1908 |
| 1,105,977 | Johnson | Aug. 4, 1914 |
| 1,315,880 | Sutton et al. | Sept. 9, 1919 |
| 1,315,881 | Sutton et al. | Sept. 9, 1919 |
| 1,813,303 | Lide | July 7, 1931 |
| 1,989,777 | Wettlaufer | Feb. 5, 1935 |